United States Patent Office 3,173,205
Patented Mar. 16, 1965

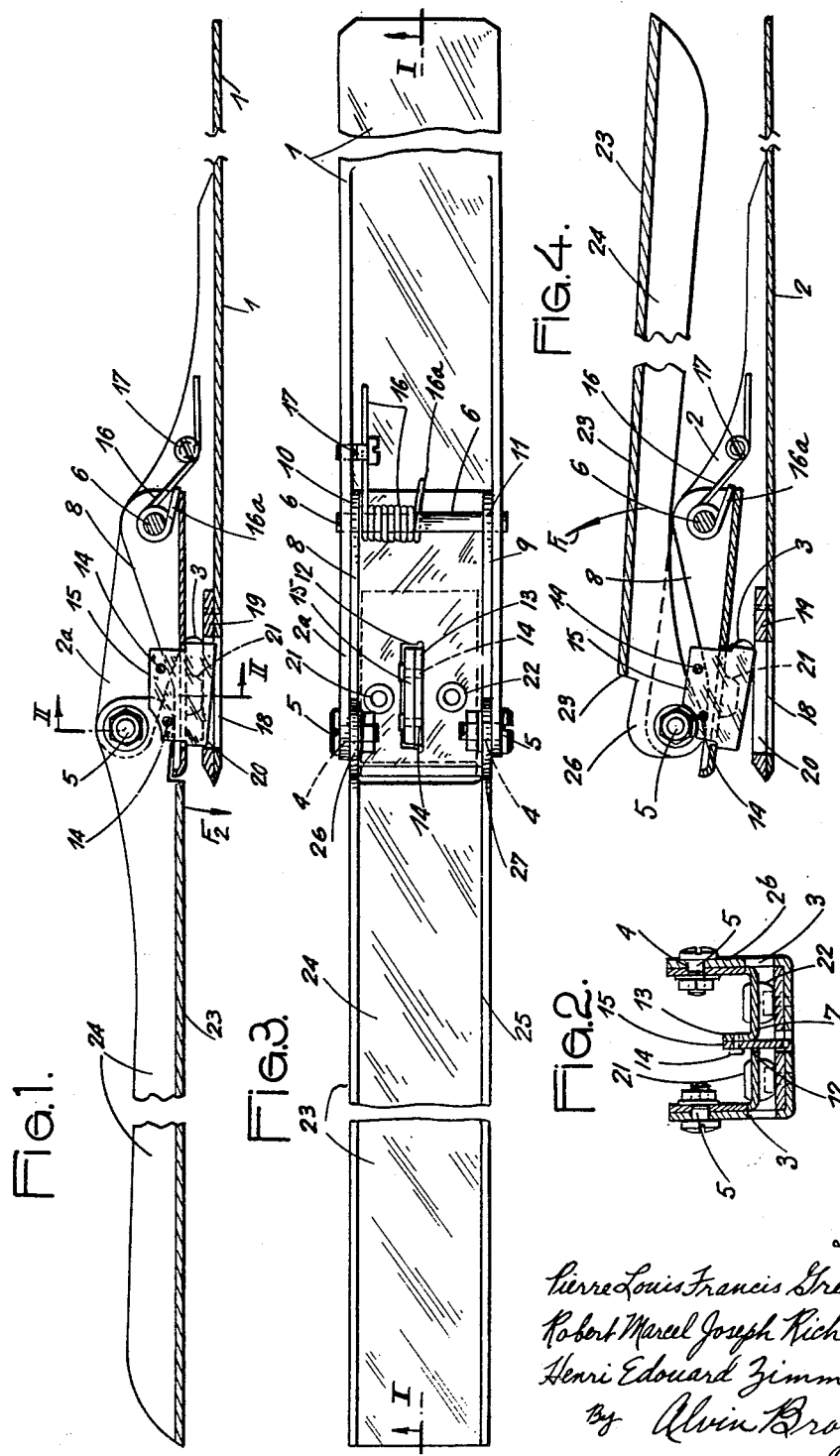

3,173,205
CUTTERS FOR STRIPS AND SIMILAR ARTICLES
Pierre Louis François Grehal, 2 Blvd. de la Gare, Saint-Brice, France; Robert Marcel Joseph Richomme, 56 Rue Waldeck-Rousseau, Saint-Nazaire, France; and Henri Edouard Zimmerlin, 9 Rue des Petits-Hotels, Paris 10, France
Filed Mar. 5, 1962, Ser. No. 177,463
Claims priority, application France, Apr. 4, 1961, 857,704
3 Claims. (Cl. 30—134)

The present invention relates to cutters more especially for strips and wire used for packing or hooping cases and various packages, these cutters preventing numerous accidents due to the springing back of strips or hooping wire when they are cut for opening up packaging.

The cutters that are the object of the invention hold the two cut ends of the hooping, thus avoiding an unexpected springing back of these ends, which are progressively released after the cutting operation.

According to the invention, the cutters for strips and similar objects are characterised in that they are formed by two jaws articulated in relation to each other, the upper jaw comprising, at its front end, cams cooperating with a part articulated on the first jaw and carrying a knife and holding components, a hole being formed in the lower jaw just below the knife.

Various other characteristics of the invention will moreover be revealed in the detailed description which follows.

A form of embodiment of the purpose of the invention is shown by way of non-restrictive example in the attached drawing.

FIGURE 1 is a longitudinal section of the open cutter, substantially along the line I—I of FIGURE 3.

FIGURE 2 is a section along the line II—II of FIGURE 1.

FIGURE 3 is a flat view of the open cutter.

FIGURE 4 is a longitudinal elevation-section of the closed cutter.

The cutter is essentially formed by a handle or arm 1 comprising on its two sides, set-back parts 2 forming two cheeks 2a and 2b. The latter each comprise a cavity of appreciably triangular shape 3. Holes 4 are drilled in the upper part of the cheeks 2a, 2b so as to receive a spindle 5. A spindle 6, fixed to the rear part of the cheeks 2a, 2b carries a part 7 of appreciably rectangular shape, having, on its longitudinal sides, set-back parts 8, 9 drilled with holes 10, 11 through which passes the spindle 6. The plate 7 is formed, in its middle, with a slot 12 whose straightened part 13 carries by means of screws 14, a blade 15. A spring 16, attached to one of its ends on a spindle 17 is wound around the spindle 6 and bears by its end 16a against the rear part of the holder plate 7. The central front part of the plate 2 which is provided with a hole 18, is reinforced at this spot by a cutting plate 19, also provided with a hole 20 concentric to the hole 18. Two buffers 21 and 22 are fixed by any suitable means under the part 7. A channel shaped handle or arm 23 comprising diminished parts 24, 25 is cut out at its front part 23a to form two cams 26, 27 articulated on the spindles 5. The parts 1 and 23 form arms for operating the cutters so that when the channel shaped handle 23 is raised in the direction of the arrow $F_1$ (FIGURE 4), the cams 26, 27 pressing on the front end of the part 7 drive the latter in the direction of the arrow $F_2$ (FIGURE 1) and at the same time driving the blade 15 which passes through the opening made by the superimposed holes 18, 20. Before this operation, the strip or wire to be cut has been introduced in the front part of the part 1 in the opening 3, and this strip or wire is cut by the blade 15. The ends of this strip or wire cut are held on the reinforced part 19 by flexible rubber buffers 21, 22 and thus cannot escape. However, if this strip or wire is stretched very tightly before being cut, there is a slight slipping, which eliminates the tension of the strip or wire. When the operating arm 23 is returned from its first position opposite the direction of the arrow $F_1$, the rotation of the cams 26, 27 releases the pressure exerted on the front part of the part 7, the spring 16 returns this part to its first position by causing the buffers 21, 22 to lift, and, owing to this, the freeing of the ends of the cut strip or wire, but, these parts being no longer under tension, they have no tendency to escape abruptly as formerly happened, with the risk of injuring the person cutting the strip or wire.

The external edges of the operating arms of the cutter are rounded so as not to injure the person using the cutter.

In the foregoing, it has been stated that the holding buffers for the ends of the object to be cut were of flexible rubber, but they can be made of any other sufficiently elastic material.

The knife 15 being detachable, can be sharpened if so required, or changed if it breaks.

In the foregoing, it has been stated that the cutters were used for cutting hooping when opening up packaging, but they can also be used during packing operations for cutting strips or wires after setting.

Various modifications can moreover be applied to the form of embodiment shown and described in detail, without going outside of the scope of the invention.

We claim:

1. A device for cutting strips and similar objects comprising a first force applying arm; a second force applying arm hinged to said first arm; a holder plate hinged to said first arm, said plate comprising a slot and turned back portion; a cutting element supported on said turned back portion; cooperative cutting means carried on said first arm, said cooperative cutting means comprising a cutting plate defining a hole through which said cutting element can project; cam means on said second arm to force said cutting means into engagement with said cooperative cutting means as said second arm is rotated with respect to said first arm; and holding means on both sides of said cutting element to restrain the object being cut as said cutting element and cooperative cutting means engage.

2. A device for cutting strips and similar objects comprising a first force applying arm; a second force applying arm hinged to said first arm; a holder plate hinged to said first arm, said plate comprising a slot and turned back portion; a cutting element supported on said turned back portion; cooperative cutting means carried on said first arm; cam means on said second arm to force said cutting element into engagement with said cooperative cutting means as said second arm is rotated with respect to said first arm, wherein said rotation with said second arm causes force to be applied against said cutting means; and holding means on both sides of said cutting element to restrain the object being cut as said cutting element and cooperative cutting means engage.

3. A device for cutting strips and similar objects comprising a first force applying arm; a second force applying arm hinged to said first arm; a holder plate hinged to said first arm, said holder plate comprising a slot and turned back portion; a cutting element supported by said turned back portion; cooperative cutting means carried on said first arm; cam means on said second arm to force said cutting element into engagement with said cooperative cutting means as said second arm is rotated with respect to said first arm; and holding means on both sides of said cutting element and mounted on said holder plate to restrain the object being cut as said cutting element and cooperative cutting means engage.

(References on following page)

References Cited by the Examiner

UNITED STATES PATENTS

| | | | |
|---|---|---|---|
| 522,108 | 6/94 | Darone | 30—253 |
| 579,849 | 3/97 | Tissot | 30—189 X |
| 1,007,836 | 11/11 | Allison | 30—261 |
| 2,302,810 | 11/42 | Steegmuller | 30—124 |
| 2,375,364 | 5/45 | Hood | 30—258 X |
| 2,392,118 | 1/46 | Cacarillo | 30—261 |
| 2,459,864 | 1/49 | Bissett et al. | 30—134 |
| 2,564,269 | 8/51 | McCoy | 30—250 |
| 2,673,394 | 3/54 | Palmleaf | 30—253 |
| 2,740,196 | 4/56 | Ehinger | 30—261 X |
| 2,814,869 | 12/57 | Matson | 30—124 |
| 2,885,781 | 5/59 | Bauer | 30—261 X |

FOREIGN PATENTS 979   1879   Great Britain.

WILLIAM FELDMAN, *Primary Examiner.*

EDWARD V. BENHAM, *Examiner.*